(12) United States Patent
Hosaka et al.

(10) Patent No.: US 9,140,183 B2
(45) Date of Patent: Sep. 22, 2015

(54) FUEL INJECTION CONTROLLER

(71) Applicant: DENSO CORPORATION, Kariya, Aichi-pref. (JP)

(72) Inventors: Yuuta Hosaka, Chiryu (JP); Kensuke Mizui, Toyota (JP); Mikio Teramura, Okazaki (JP); Minoru Hozuka, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/444,091

(22) Filed: Jul. 28, 2014

(65) Prior Publication Data

US 2015/0046068 A1 Feb. 12, 2015

(30) Foreign Application Priority Data

Aug. 9, 2013 (JP) ................................. 2013-166293

(51) Int. Cl.
| | |
|---|---|
| *F02D 41/04* | (2006.01) |
| *F02B 75/12* | (2006.01) |
| *F02D 41/14* | (2006.01) |
| *F02D 41/24* | (2006.01) |
| *F02D 41/40* | (2006.01) |
| *F02D 45/00* | (2006.01) |
| *F02D 41/38* | (2006.01) |

(52) U.S. Cl.
CPC ............. *F02B 75/12* (2013.01); *F02D 41/1454* (2013.01); *F02D 41/2438* (2013.01); *F02D 41/2464* (2013.01); *F02D 41/401* (2013.01); *F02B 2075/125* (2013.01); *F02D 41/047* (2013.01); *F02D 2041/389* (2013.01)

(58) Field of Classification Search
CPC ......... F02D 41/00; F02D 41/04; F02D 41/06; F02D 45/00; F02D 41/3005; F02B 75/12; F02B 2075/125
See application file for complete search history.

(56) References Cited

U.S. PATENT DOCUMENTS

| | | | | |
|---|---|---|---|---|
| 4,807,581 A | * | 2/1989 | Nishikawa et al. | 123/480 |
| 6,382,188 B2 | * | 5/2002 | Hasegawa et al. | 123/491 |
| 2001/0008134 A1 | * | 7/2001 | Hasegawa et al. | 123/491 |
| 2005/0204805 A1 | | 9/2005 | Wakahara et al. | |

FOREIGN PATENT DOCUMENTS

| | | | | |
|---|---|---|---|---|
| JP | 2000027686 A | * | 1/2000 | ............... F02D 45/00 |
| JP | 2007-177740 | | 7/2007 | |

(Continued)

OTHER PUBLICATIONS

Office Action (2 pages) dated Jun. 23, 2015 issued in corresponding Japanese Application No. 2013-166293 and English translation (3 pages).

*Primary Examiner* — Hieu T Vo
(74) *Attorney, Agent, or Firm* — Nixon & Vanderhye PC

(57) ABSTRACT

In a fuel injection controller that controls a fuel injection device that injects fuel directly into cylinders of an engine, a unit that detects an interference period gradually shifts an injection period of fuel from the fuel injector from a first period during which the injection period does not overlap with an initial value of the interference period, and is distant from the initial value by a given value or larger toward a second period during which the injection period overlaps with the initial value of the interference period. Then, the fuel injection controller detects an actual interference period according to a variation of an air-fuel ratio (A/F value) detected by an air-fuel ratio sensor toward lean.

7 Claims, 8 Drawing Sheets

(56) References Cited

FOREIGN PATENT DOCUMENTS

| JP | 2007-291887 | 11/2007 | | |
| JP | 2009-203880 | 9/2009 | | |
| JP | 2010-209896 | 9/2010 | | |
| JP | 2010-223018 | 10/2010 | | |
| JP | 2010242707 A | * 10/2010 | ............. | F02D 41/06 |
| JP | 2012-149561 | 8/2012 | | |

* cited by examiner

FUEL INJECTION CONTROLLER

CROSS-REFERENCE TO RELATED APPLICATION

This application is based on Japanese Patent Application No. 2013-166293 filed on Aug. 9, 2013, the disclosure of which is incorporated herein by reference.

TECHNICAL FIELD

The present disclosure relates to a fuel injection controller for a cylinder-direct injection engine.

BACKGROUND

A cylinder-direct injection engine has an injector which injects a fuel directly into a cylinder of the engine.

In the engine of this type, there is an interference period which is a range of a crank angle at which a part of the fuel injected from the injector is adhered to an opened intake valve. When an injection period, that is, a period during which the fuel is injected from the injector overlaps with the interference period, the fuel injected from the injector is adhered to the intake valve. As a result, a necessary amount of fuel cannot be supplied into the cylinder, which may cause a deterioration of emission and a reduction in an engine output. For that reason, for example, JP-A-2007-291887 discloses the injection period is changed and corrected to avoid the interference period.

Generally, in an engine, it is conceivable that an open/close period and a lift quantity of an intake valve are varied from an initial state due to abrasion or aging of the valve mechanism. Also, it is conceivable that an injection direction of fuel from the injector is deviated from the initial direction due to a variation in shape of an injection port of the injector or a variation in mounting angle of the injector.

For that reason, it is conceivable that the interference period is shifted with time. However, in a cylinder-direct injection engine shown in JP-A-2007-291887, it is assumed that the interference period is fixed. Even when the injection period is changed and corrected, the injected fuel may be adhered to the intake valve.

SUMMARY

It is an object of the present disclosure to provide a fuel injection controller which is able to detect an actual interference period.

According to an aspect of the present disclosure, a fuel injection controller controls a fuel injector which injects a fuel directly into a cylinder of an engine during an injection period. The fuel injector controller has an air-fuel ratio sensor disposed in an exhaust passage of the engine, and an interference period detection unit detecting an interference period of a crank angle range in which the fuel injected from the fuel injector is adhered to an opened intake valve.

The interference period detection unit shifts an injection period during which a fuel is injected from the fuel injector from a first period during which the injection period does not overlap with an interference period toward a second period during which the injection period overlaps with the interference period. Then, the interference period detection unit detects the interference period according to a variation of an air-fuel ratio detected by an air-fuel ratio sensor disposed in an exhaust path of the engine.

Accordingly, the fuel injection controller can detect the actual interference period by the interference period detection unit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

A fuel injection controller (hereinafter referred to as "ECU") according to embodiments of the present disclosure will be described.

First Embodiment

Figure 1:
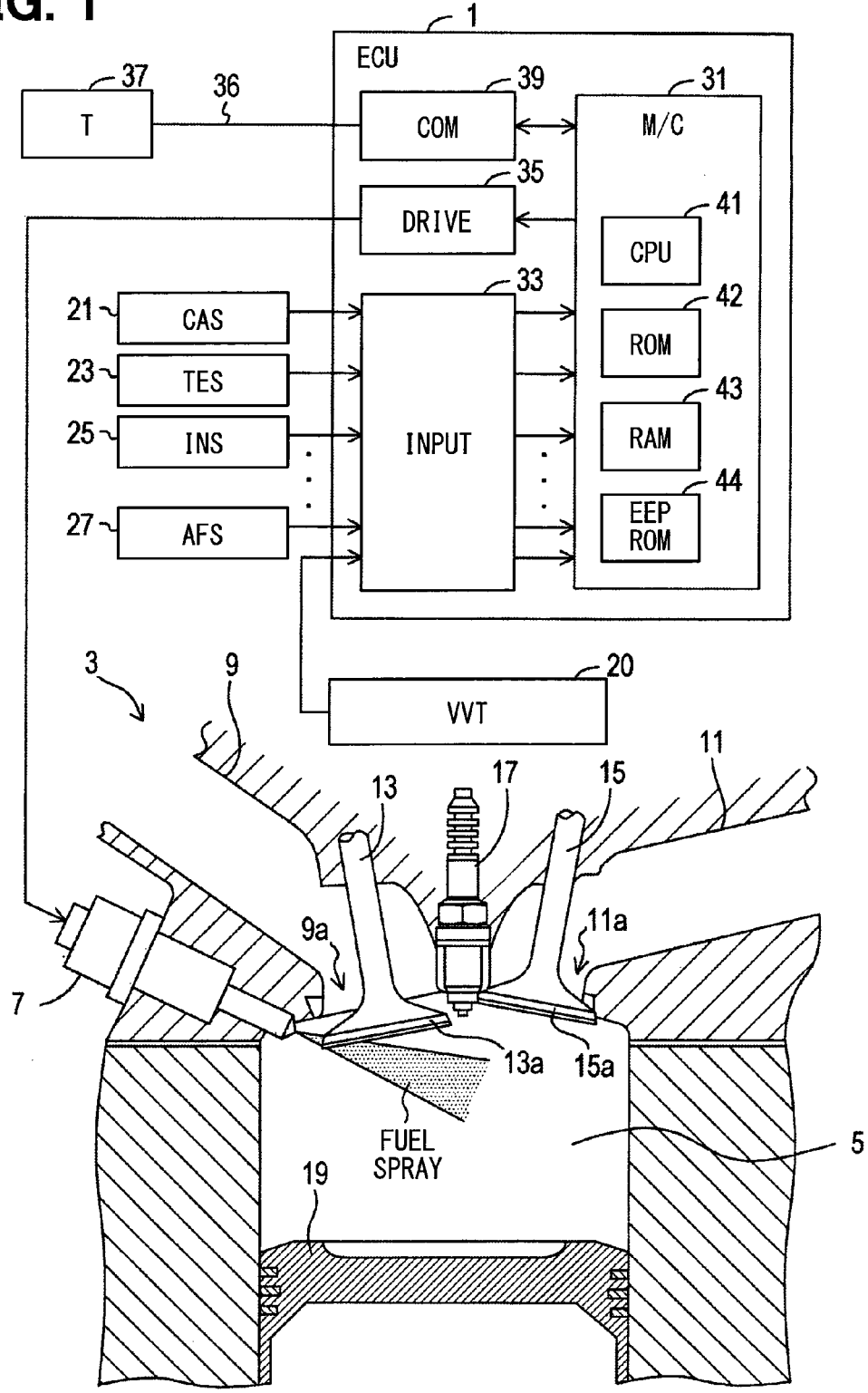
FIG. 1 is a configuration diagram illustrating a fuel injection controller according to a first embodiment.

As illustrated in FIG. 1, an engine 3 controlled by an ECU 1 is a cylinder-direct injection engine mounted in a vehicle, and includes an injector 7 injecting a fuel directly into a cylinder 5 of the engine 3. The engine 3 is provided with four cylinders 5 in the present embodiment.

Further, the engine 3 includes an intake port 9, an exhaust port 11, an intake valve 13 having an umbrella portion 13a that opens and closes an opening portion 9a of the intake port 9, an exhaust valve 15 having an umbrella portion 15a that opens and closes an opening portion 11a of the exhaust port 11, an ignition plug 17, and a piston 19 that moves within the cylinder 5, for each cylinder 5. Also, the engine 3 is equipped with a variable valve mechanism 20 that changes an opening/closing timing of at least the intake valve 13 according to a load of the engine 3.

The ECU 1 receives various sensor signals from a crank angle sensor 21 for detecting a rotating speed (engine speed) of the engine 3 and a crank angle, a water temperature sensor 23 for detecting a coolant temperature of the engine 3, an intake quantity sensor 25 for detecting an intake air quantity of the engine 3, and an air-fuel ratio sensor 27 disposed in an exhaust passage of the engine 3 for detecting an air-fuel ratio. The air-fuel ratio will be referred to as "A/F", hereinafter. Also, the ECU 1 receives an advance/retard angle signal transmitted from the variable valve mechanism 20.

A crank angle signal transmitted from the crank angle sensor 21 is level-changed in a pulsed fashion every time when a crank shaft (not shown) of the engine 3 rotates by a given angle (for example, 30°). The advance/retard angle signal transmitted from the variable valve mechanism 20 represents an angular amount by which the variable valve mechanism 20 advances or retards the opening timing of the intake valve 13 relative to a standard timing. The above angular amount is referred to as "A/D-angle variable", hereinafter.

The ECU 1 includes a microcomputer 31 that conducts a processing for controlling the injector 7, an input circuit 33 that transmits the above various sensor signals and the advance/retard angle signal to the microcomputer 31, and a drive circuit 35 that opens the injector 7 according to an injection instruction signal transmitted from the microcomputer 31.

The ECU1 also includes a communication circuit 39 for communicating with a failure diagnosis tool 37 detachably connected to a communication line 36 disposed within the vehicle. When the failure diagnosis tool 37 is connected to the communication line 36, the microcomputer 31 communicates with the failure diagnosis tool 37 through the communication circuit 39.

The microcomputer 31 includes a CPU 41, a ROM 42, a RAM 43 and a nonvolatile memory 44, such as EEPROM. The ROM 42 stores a program, a map for calculating control information, and the like. The RAM 43 stores calculation results of the CPU 41. The operation of the microcomputer 31 described below is realized by allowing the CPU 41 to execute the program within the ROM 42.

Subsequently, processing conducted by the microcomputer 31 will be described. Hereinafter, one cylinder 5 will be described below, and the same is applied to the other cylinders 5.

[Normal Injection Control Processing]

Normal injection control processing is conducted for injecting fuel which is necessary to operate the engine 3 normally. The normal injection control processing includes an injection-quantity-calculation processing, an injection-period-calculation processing, an injection-period-correction processing, and an injection-instruction-setting processing described below.

(Injection-Quantity-Calculation Processing)

The microcomputer 31 calculates an injection quantity, that is, a fuel quantity injected from the injector 7 on the basis of operating state information such as an engine speed, an intake air amount, or a coolant temperature. The injection quantity is calculated, for example, with the use of a map or an arithmetic expression stored in the ROM 42.

(Injection-Period-Calculation Processing)

The microcomputer 31 calculates an injection start timing of fuel on the basis of the operating state information such as the engine speed, the intake air amount, or the coolant temperature, and calculates a period until an injection time corresponding to an injection quantity calculated in the injection-quantity-calculation processing (that is, time necessary to inject the fuel of the injection quantity) elapses from the injection start timing as the injection period.

The injection start timing is also calculated, for example, with the use of the map or the arithmetic expression stored in the ROM 42. Also, for example, a crank angle at which the fuel injection starts is calculated as the injection start timing, and a time at which the crank angle becomes an arbitrary value or the crank angle at an arbitrary time can be predicted and calculated from the engine speed. Therefore, the respective timings such as the injection start timing or the injection end timing can be represented by both of the crank angle and the time. The respective periods such as the injection period or an interference period to be described later can be also expressed by both ranges of the crank angle and the time. In the following description, when the time is not explicitly shown, units of the period and the timing are expressed by the crank angle.

(Injection-Period-Correction Processing)

The microcomputer 31 determines whether the injection period calculated in the injection-period-calculation processing overlaps with the interference period grasped at present. The interference period represents a range of the crank angle at which a part of fuel injected from the injector 7 is adhered to the opened intake valve 13. For example, a reference value of the interference period is stored in the EEPROM 44, and the microcomputer 31 calculates a period obtained by totally advancing or retarding the reference value of the interference period by the ND-angle variable indicated by the advance/retard angle signal from the variable valve mechanism 20 as the interference period. The calculated interference period represents a present interference period.

When the microcomputer 31 determines that the calculated injection period does not overlap with the interference period, the microcomputer 31 sets the injection period as a final injection period. Also, when the microcomputer 31 determines that the calculated injection period overlaps with the interference period, the microcomputer 31 changes the injection period so as to avoid the interference period (that is, so as not to overlap with the interference period), and sets the changed injection period as the final injection period. For example, the microcomputer 31 shifts the overall injection period before or after the interference period, or divides the injection period before and after the interference period, as a process of changing the injection period.

(Injection-Instruction-Setting Processing)

The microcomputer 31 conducts an injection-instruction-setting processing for outputting the injection instruction signal to the drive circuit 35 (in detail, setting the injection instruction signal to an active level) during the final injection period determined through the injection-period-correction processing.

For example, the microcomputer 31 includes an injection instruction timer outputting the injection instruction signal. The injection instruction timer sets the injection instruction signal to the active level during a period from the set-output-start time to the set-output-ending time. The drive circuit 35 allows the injector 7 to open the valve while the injection instruction signal from the microcomputer 31 is maintained at the active level. For that reason, the microcomputer 31 sets a start time of the injection period as the output-start time, and an ending time of the injection period as the output-ending time in the injection instruction timer in the injection-instruction-setting processing.

Figure 2:
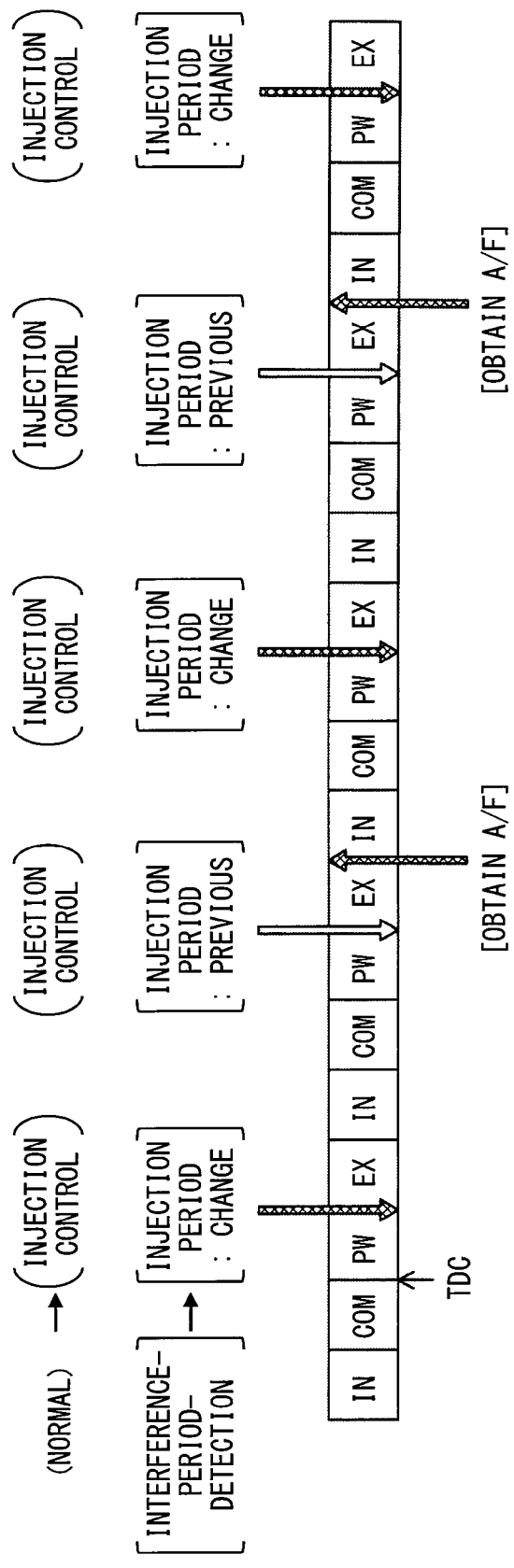
FIG. 2 is a time chart illustrating timing at which a processing is implemented.

In this embodiment, the microcomputer 31 conducts the injection control processing at a given timing for each cycle of the cylinder 5, for example, at a timing immediately before an exhaust stroke as indicated by a down arrow in FIG. 2. Then, the fuel injection from the injector 7 is implemented within a period from an intake stroke to a compression stroke after the exhaust stroke. Also, when the injection period is divided into two periods through the injection-period-correction processing, for the latter injection period, for example, after the fuel injection of the first injection period is completed, the injection-instruction-setting processing is conducted. On the other hand, all or a part of the injection control processing other than the injection-instruction-setting processing may be implemented in a cycle longer than each cycle of the cylinder 5. Also, "TDC" in FIG. 2 denotes a top dead center of the compression stroke.

(Interference-Period-Detection Processing: Detection Processing)

It is conceivable that an open/close period of the intake valve 13 is shifted from an initial state, for example, due to a temporal change (for example, abrasion or deterioration) of components of the variable valve mechanism 20. Also, it is conceivable that an injection direction of fuel from the injector 7 is deviated from the initial state due to an aging of the injector 7. Hence, it is conceivable that the interference period is changed with time.

For that reason, when a given detection implementation condition is met, the microcomputer 31 implements detection processing for detecting an actual interference period, and uses the interference period detected in the detection processing as a reference value of the above-mentioned interference period in the injection-period-correction processing.

The detection processing is implemented for each cylinder 5, and at a timing (timing indicated by down arrows in FIG. 2) immediately before the exhaust stroke instead of processing (injection-period-calculation processing, injection-period-correction processing, injection-instruction-setting processing) in the injection control processing other than the injection-quantity-calculation processing. In this embodiment, the detection processing is sequentially implemented for each of the cylinders 5.

Also, the detection processing includes processing (hereinafter referred to as "start-timing-detection processing of interference period", or merely as "start-timing-detection processing") for detecting the start timing of the interference period, and processing (hereinafter referred to as "ending-timing-detection processing of the interference period", or merely as "ending-timing-detection processing") for detecting the ending timing of the interference period. That is, the detection processing is a generic name of the start-timing-detection processing and the ending-timing-detection processing.

The microcomputer 31 gradually shifts the injection period from a first period in which the injection period does not surely overlap with the interference period toward a second period in which the injection period overlaps with the interference period, in the detection processing. Then, the microcomputer 31 detects the actual interference period (in detail, start timing and ending timing of the interference period) according to a variation of an A/F value detected by the A/F sensor 27 toward a lean side, that is, the variation of the A/F value caused by allowing the shifted injection period to overlap with the interference period. For that reason, in the detection processing, the microcomputer 31 implements processing (in detail, processing for converting the signal from the A/F sensor 27 into the A/F value, and storing the A/F value) for acquiring the A/F value from the A/F sensor 27, immediately after the exhaust stroke as indicated by up arrows in FIG. 2.

Even when the processing for shifting the injection period is conducted at timing immediately before the exhaust stroke, this processing affects the A/F value immediately after a subsequent exhaust stroke. For that reason, in the detection processing, the microcomputer 31 conducts processing for changing (shifting) the injection period every time the timing immediately before the exhaust stroke comes twice (that is, in every two cycles), and makes the injection period identical with a previous value at timing immediately before another exhaust stroke. Then, the microcomputer 31 conducts the processing for acquiring the A/F value from the A/F sensor 27 at every timing (that is, timing immediately after the exhaust stroke in a cycle where the injection period is not changed) immediately after the exhaust stroke after the fuel injection is implemented in the changed injection period.

Figure 3:
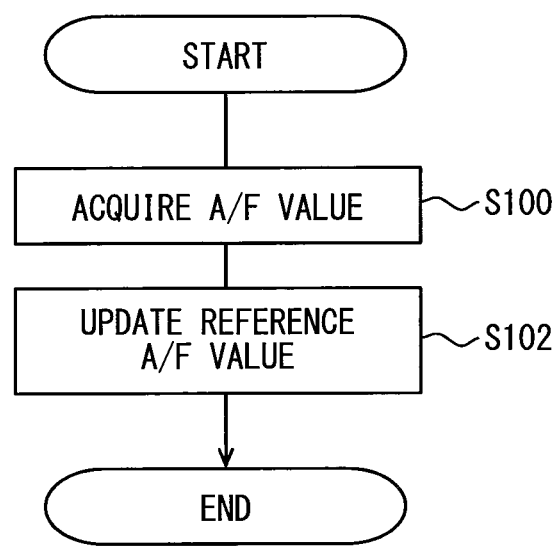
FIG. 3 is a flowchart illustrating an A/F-value-acquisition processing.

In FIG. 2, timing indicated by hatched down arrows among the down arrows represents timing at which the processing for changing the injection period is conducted. Timing indicated by unhatched down arrows represents timing at which the processing for making the injection period identical with the previous value is conducted. Timing indicated by hatched up arrows represents timing at which the A/F value is acquired. Also, at the timing when the A/F value is acquired, the microcomputer 31 conducts the A/F-value-acquisition processing in FIG. 3. In the A/F-value-acquisition processing, the microcomputer 31 acquires the A/F value from the A/F sensor 27 in S100, and overwrites the acquired A/F value, for example, on a storage area in which a reference A/F value is stored in a storage area of the RAM 42 in S102. For that reason, the reference A/F value is updated to the A/F value acquired this time. The reference A/F value represents an A/F value to which is referred at the time of executing another processing (detection processing in this example) in the microcomputer 31.

In the following description, that the microcomputer 31 conducts the detection processing in each of all the cylinders 5 to detect the interference period is called "interference period detection".

(Overall Processing Including Detection Processing)

Figure 4:
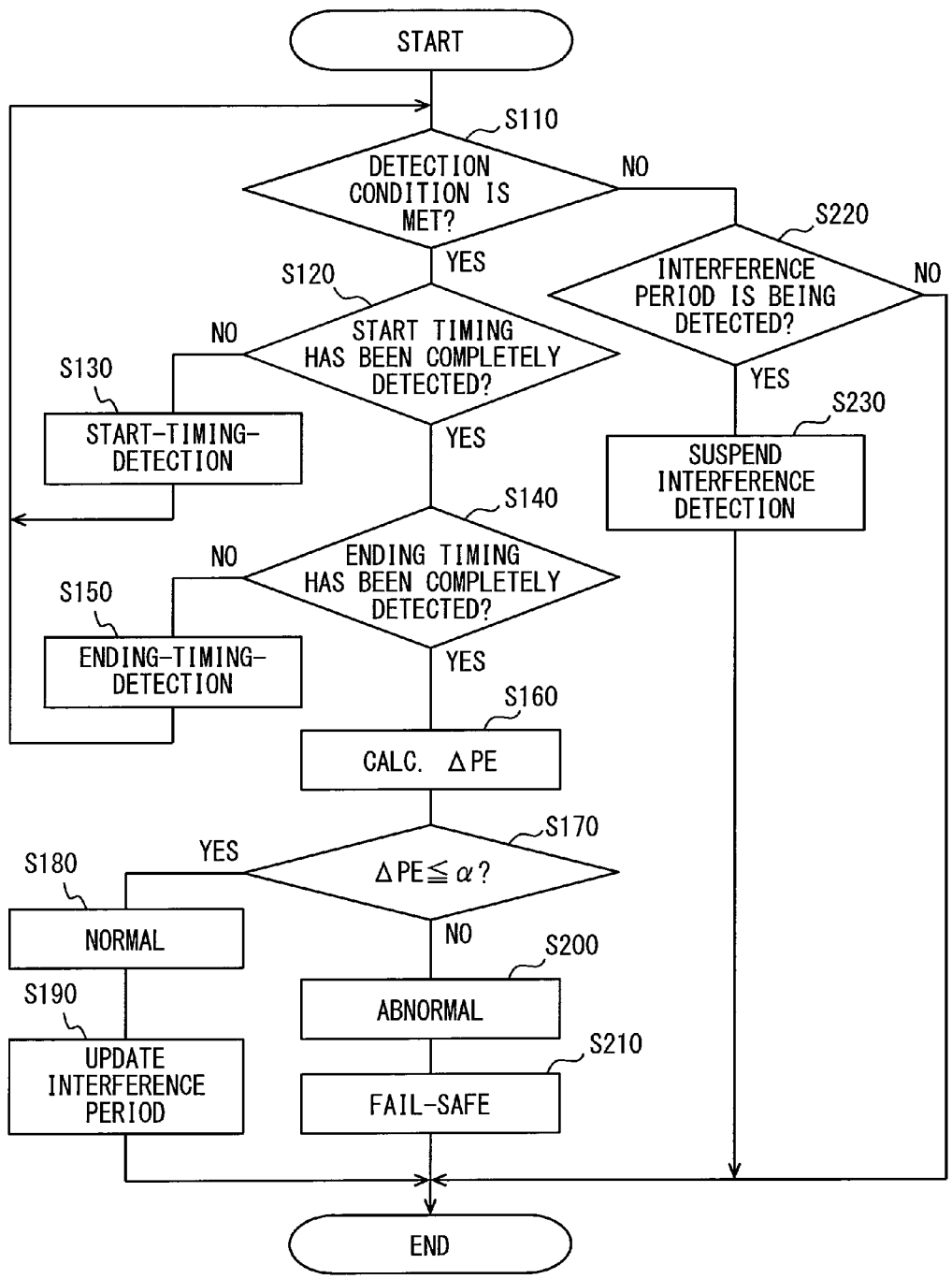
FIG. 4 is a flowchart illustrating an overall processing including an interference-period-detection processing.

The overall processing including the detection processing is implemented as illustrated in FIG. 4.

The microcomputer 31 starts to operate when the ECU 1 is powered for operation, and conducts the overall processing of FIG. 4, for example, at every given time interval. When a user of the vehicle conducts the operation (for example, operation for turning on an ignition switch, or pushing a push start switch) for bringing the vehicle into an ignition-on state, a voltage across a battery is applied to the ECU 1 as an operation power to start the microcomputer 31. Also, the processing in FIG. 4 is implemented in the normal operation state of the engine 3.

When starting the overall processing, the microcomputer 31 first determines whether a detection implementation condition representing a condition under which the detection processing is implemented is met, in S110.

The detection implementation condition represents, for example, a condition that all of the respective following conditions (1) to (6) are met. A term "fixed" in the following conditions conceptually means "stable". When quantitatively expressed, a change in appropriate physical quantity is a given value or lower including "0".

(1) An operating state in which an injection quantity calculated in the injection-quantity-calculation processing is fixed.

Realistically, the above operating state may be an operating state in which a change in the injection quantity becomes a given value or lower. The given value may be set to such a value that a variation in the A/F value caused by a change in the injection quantity becomes negligibly small in the detection processing. Also, specific examples of the condition (1) include, for example, that the engine speed is fixed, and that a load of the engine 3 is fixed.

(2) The advance/retard angle controlled variable of the opening/closing timing of the intake valve 13 by the variable valve mechanism 20 is fixed.

In this embodiment, for example, that the ND-angle variable is stably "0" as the condition. As another example, the ND-angle variable may be stably a given value other than "0" as the condition.

(3) The A/F value is fixed.

(4) The A/F sensor 27 is normal.

(5) The variable valve mechanism 20 is normal.

(6) The engine speed is as low as a given value or lower.

The conditions (1) to (5) are intended to eliminate the variation in the A/F value caused by an external factor, and the condition (6) is intended to put an allowance into a time length of the period other than the interference period. Also, as another condition in the detection implementation condition, for example, a condition that "the interference periods for all of the cylinders 5 have not yet been completely detected after the vehicle has been brought into the ignition-on state" may be added. When this condition is added, the microcomputer 31 implements the interference period detection at most once (in other words, not implemented twice or more) during a period (during a so-called one trip) in which the vehicle is kept in the ignition-on state.

When the microcomputer 31 determines that the detection implementation condition is met in S110, the microcomputer 31 determines whether the start timing (hereinafter also referred to as "interference period start timing") of the interference period has been completely detected for all of the cylinders 5 in S120. Then, when the microcomputer 31 has not yet completely detected the interference period start timing for all of the cylinders 5 (NO in S120), the microcomputer 31 conducts the start-timing-detection processing for detecting the interference period start timing for the cylinders 5 for which the interference period start timing has not yet been completely detected in S130, and the flow returns to S110. The contents of the start-timing-detection processing will be described later.

Also, when the microcomputer 31 has completely detected the interference period start timing for all of the cylinders 5 (YES in S120), the microcomputer 31 determines whether the ending timing (hereinafter also referred to as "interference-period-ending timing") of the interference period has been completely detected for all of the cylinders 5 in S140. When the microcomputer 31 has not yet completely detected the interference-period-ending timing for all of the cylinders 5 (NO in S140), the microcomputer 31 conducts the ending-timing-detection processing for detecting the interference-period-ending timing for the cylinders 5 for which the inter-ference-period-ending timing has not yet been completely detected in S150, and the flow returns to S110. The contents of the ending-timing-detection processing will be also described later.

When the microcomputer 31 has completely detected the start timing and the ending timing of the interference period for all of the cylinders 5 (YES in S140), the interference period has been detected for all of the cylinders 5. Thereafter, the microcomputer 31 conducts the processing of S160 to S210 for each cylinder 5.

The microcomputer 31 calculates a difference ΔPE between the detected interference period and an initial interference period in S160. Specifically, the microcomputer 31 calculates the difference ΔPE between the detected interference period and the initial interference period (an absolute value of the difference, and its unit is a crank angle) for each of the start timing and the ending timing. The initial interference period represents an initial value (interference period at the time of manufacturing the vehicle) of the interference period under the condition where the detection processing is implemented (that is, in a case where the detection implementation condition is met), and the initial value is stored in, for example, the ROM 42 as an initial value storage unit. Also, the initial interference period stored in the ROM 42 may be represented by a measured value, or a designed value.

Then, the microcomputer 31 determines whether each difference ΔPE (difference in each of the start timing and the ending timing) calculated in S160 is a given value α or lower in S170. When each difference is the given value α or lower, the microcomputer 31 determines that the determination result is normal in S180. In this case, the microcomputer 31 updates and stores the interference period detected this time as a reference value of the above-mentioned interference period in the EEPROM 44 in S190. That is, the microcomputer 31 rewrites the reference value of the interference period within the EEPROM 44 as the interference period detected this time. Thereafter, the microcomputer 31 completes the overall processing in FIG. 4.

Also, when the microcomputer 31 determines in S170 that at least one of the respective differences calculated in S160 is not the given value or lower, the microcomputer 31 determines in S200 that the determination result is abnormal. In this case, the microcomputer 31 conducts a fail-safe processing in S210, and thereafter completes the overall processing in FIG. 4. The microcomputer 31 conducts, for example, processing for turning on a warning light indicative of the occurrence of abnormality, or storing failure information (so-called "diagnosis code") in the EEPROM 44, as the fail-safe processing.

On the other hand, when the microcomputer 31 determines that the detection implementation condition is not met in S110, the microcomputer 31 determines whether the interference period detection is being implemented in S220. The interference period detection is being implemented during a period since it is determined in S110 that the detection implementation condition is met until the interference period has been completely detected for all of the cylinders 5. When the interference period detection is not being implemented (NO in S220), the microcomputer 31 completes the overall processing of FIG. 4. Also, when the interference period detection is being implemented (YES in S220), the flow proceeds to S230, and suspends the interference period detection. Specifically, the microcomputer 31 suspends the detection processing and the remaining detection processing (that is, detection processing for the cylinders 5 in which the interference period has not yet been detected). Thereafter, the microcomputer 31 completes the overall processing in FIG. 4.

In the overall processing of FIG. 4, the processing of S110, S220, and S230, and the processing of S120 to S150 are really executed in parallel as a multiple task. For that reason, when the detection implementation condition is not met during a period in which the detection processing (start period detection processing or ending period detection processing) is implemented in any cylinder 5, the detection processing that is being implemented and the remaining detection processing are suspended.

(Start-Timing-Detection Processing of Interference Period)

Figure 5:
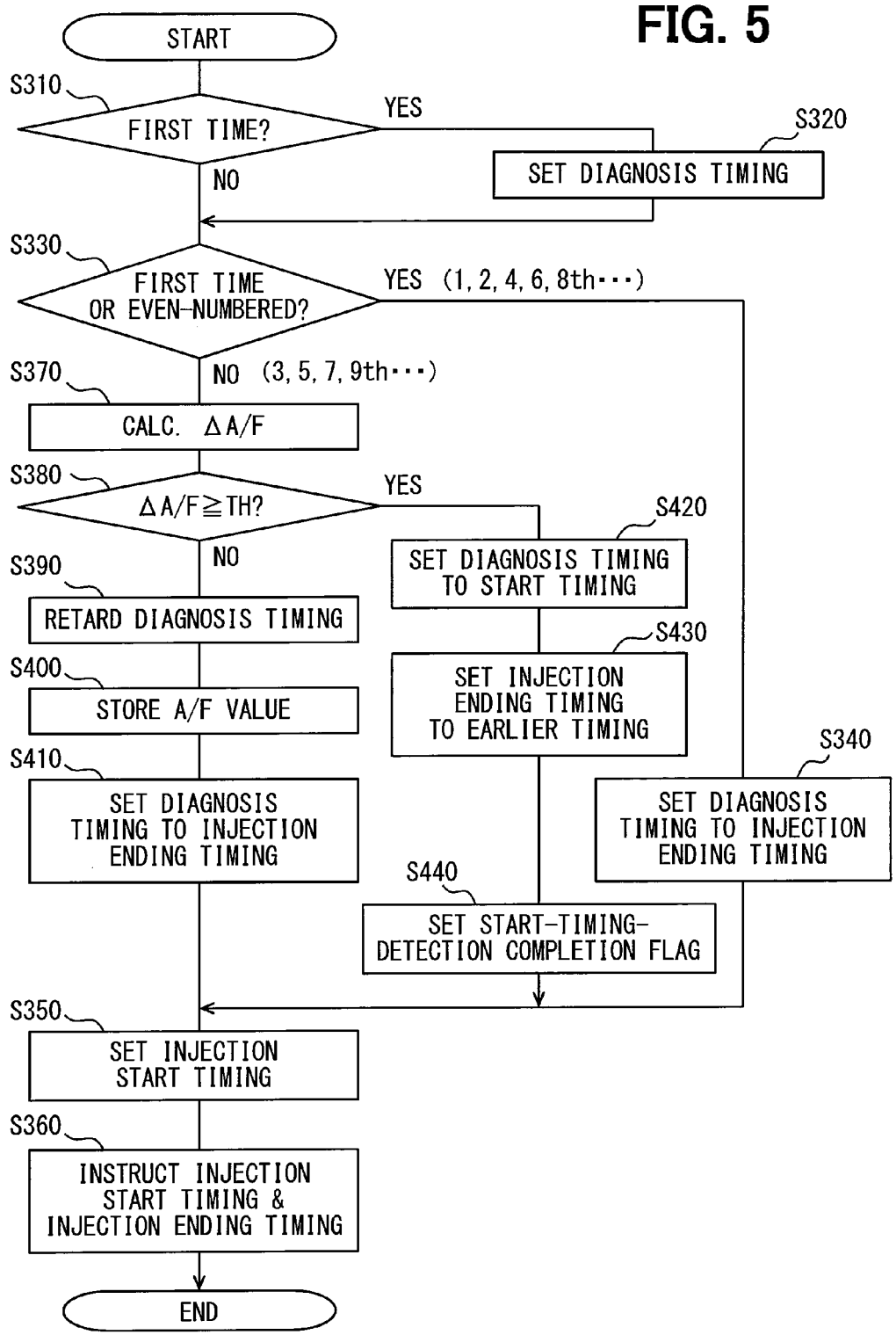
FIG. 5 is a flowchart illustrating a start-timing-detection processing of an interference period.

The microcomputer 31 repetitively conducts the start-timing-detection processing of FIG. 5 for each of the cylinders 5 until the interference period start timing has been completely detected, in S130 of FIG. 4. The start-timing-detection processing is executed at each timing (timings indicated by down arrows in FIG. 2) immediately before the exhaust stroke of the cylinder 5 (hereinafter merely referred to as "target cylinder") in which the interference period is to be detected. Then, the injection quantity is calculated for the target cylinder through the above-mentioned injection-quantity-calculation processing before the start-timing-detection processing starts.

As illustrated in FIG. 5, when the microcomputer 31 starts the start timing detection process, the microcomputer 31 first determines whether the present execution of the start-timing-detection processing for the target cylinder is a first time execution in S310. When the present execution is the first time execution, the microcomputer 31 sets a timing of before the start timing of an initial interference period by a given forward margin as a diagnosis timing in S320. The forward margin represents a value (unit is a crank angle) larger than a calculated maximum shift amount by which the start timing of the actual interference period is shifted forward from the start timing of the initial interference period. Also, the diagnosis timing dealt with in the start-timing-detection processing is auxiliary information for determining the injection ending timing (ending timing of injection timing).

When the microcomputer 31 conducts the processing in S320, or determines that the present execution is not the first execution in S310, the flow proceeds to S330. Then, the microcomputer 31 determines whether the present execution of the start-timing-detection processing is the first time execution or an even-numbered execution, for the target cylinder.

Then, when the present execution is the first time execution or an even-numbered execution (YES in S330), the flow proceeds to S340, the microcomputer 31 sets the diagnosis timing at that time as the injection ending timing, and the flow proceeds to S350.

The microcomputer 31 sets a timing before the injection ending timing set in the start-timing-detection processing by an injection time corresponding to the injection quantity as the injection start timing (start timing of the injection period) in S350. Then, the microcomputer 31 conducts processing for instructing the injector 7 on the injection start timing and the injection ending timing set in the start-timing-detection processing, in subsequent S360. Specifically, as in the injection-instruction-setting processing, the microcomputer 31 sets a time of the injection start timing as the output-start time of the injection instruction signal, and also sets the time of the injection ending timing as the output-ending time of the injection instruction signal, for the injection instruction timer. Thereafter, the microcomputer 31 completes the start-timing-detection processing. For that reason, the injector 7 of the target cylinder allows the valve to open by the aid of the drive circuit 35 during a period from the injection start timing set in the start-timing-detection processing to the injection ending timing.

Also, when the microcomputer 31 determines that the present execution of the start-timing-detection processing is neither the first time execution nor an even-numbered execution (that is, an odd-numbered execution other than the first time execution) in S330 (NO in S330), the flow proceeds to S370.

The microcomputer 31 calculates a difference ΔA/F (absolute value of the difference) between an acquired value of the A/F value and a stored value of the A/F value in S370. The acquired value of the A/F value represents an updated A/F value (reference A/F value) acquired from the A/F sensor 27 in the above-mentioned A/F-value-acquisition processing (FIG. 3) for the target cylinder. Also, the stored value of the A/F value represents an A/F value stored in the RAM 43 in S400 described later in the last but one start-timing-detection processing. When the present execution of the start-timing-detection processing is a third time execution, because the stored value of the A/F value is not yet present, the calculated difference is set as a fixed value smaller than a threshold value used for determination in subsequent S380, in S370.

Subsequently, the microcomputer 31 determines in S380 whether the difference ΔA/F calculated in S370 is larger than or equal to the threshold ΔTH. When the difference ΔA/F is not larger than or equal to the threshold ΔTH, the flow proceeds to S390.

The microcomputer 31 changes the diagnosis timing to a value retarded (later) by a given value smaller than the above-mentioned forward margin (unit is a crank angle) in S390. The microcomputer 31 stores the acquired value of the A/F value read in the present S370 as the stored value of the A/F value in the RAM 43 in subsequent S400. Then, as in Step 340, the microcomputer 31 sets the diagnosis timing at that time as the injection ending timing in subsequent S410. Thereafter, the microcomputer 31 conducts the processing in S350 and S360, and completes the start-timing-detection processing.

When the microcomputer 31 determines in S380 that the difference calculated in S370 is larger than or equal to the threshold, the flow proceeds to S420. The microcomputer 31 stores the diagnosis timing at that time as the detection result of the start timing of the interference period, for example, in the EEPROM 44.

Subsequently, the microcomputer 31 sets a timing before the diagnosis timing by a given value as the injection ending timing in S430. This is for the injection period of the fuel injection implemented from now to be prevented from overlapping with the actual interference period. The given value used in S430 is identical with, for example, the given value by which the diagnosis timing is retarded in S390, but may be larger than that value.

The microcomputer 31 sets a start-timing-detection completion flag for the target cylinder in subsequent S440. Thereafter, the microcomputer 31 conducts the processing of S350 and S360, and completes the start-timing-detection processing.

When the start-timing-detection completion flag for the target cylinder is set in S440, it is determined that the interference period start timing has been completely detected for the target cylinder, in S120 of the overall processing of FIG. 4. Then, in S130 of FIG. 4, the start-timing-detection processing is conducted on another cylinder 5 of which interference period start timing has not yet been detected as a target cylinder. Also, the start-timing-detection completion flag represents a flag stored in, for example, the EEPROM 44.

(Start-Timing-Detection Processing)

At the time of the first time execution of the start-timing-detection processing, the microcomputer 31 sets a timing of before the start timing of the initial interference period by a forward margin as an injection ending timing (S320, S340). Then, even when how many times the start-timing-detection processing is executed, the microcomputer 31 sets the timing of before the set injection ending timing by the injection time as the injection start timing. Also, the microcomputer 31 allows the injector 7 to inject fuel during a period from the set injection start timing to the injection ending timing (S350, S360). The injection quantity when the start-timing-detection processing is implemented is fixed.

Also, the microcomputer 31 sets the injection ending timing to the same value as the previously set value at an even-numbered execution time of the start-timing-detection processing (S340). Further, the microcomputer 31 acquires the A/F value from the A/F sensor 27 at each timing immediately after the exhaust stroke after the even-numbered start-timing-detection processing has been executed. In the above-mentioned FIG. 2, the timings indicated by the unhatched down arrows represent even-numbered execution timings of the start-timing-detection processing. The timings indicated by the hatched down arrows represent odd-numbered execution timings of the start-timing-detection processing.

Then, the microcomputer 31 calculates a difference (that is, variation of the A/F value) between an updated acquired value of the A/F value, and the stored value which is a previous acquired value of the A/F value at the time of an odd-numbered execution of the start-timing-detection processing other than the first time execution (S370). Further, the microcomputer 31 determines whether the calculated difference is a threshold value or larger (S380). When the difference is not larger than or equal to the threshold (NO in S380), the microcomputer 31 determines that the injection period adjusted in the start-timing-detection processing has not yet overlapped with the interference period, and changes the injection ending timing to a value retarded from the previous set value by a given value (S390, S410). In this case, the injection timing is retarded toward the interference period by the given value. On the other hand, when the calculated difference is larger than or equal to the threshold (YES in S380), the microcomputer 31 determines that the set value (diagnosis timing) of the present injection ending timing is the start timing of the actual interference period, and stores the set value of the injection ending timing in the EEPROM 44 as the start timing of the interference period (S420). This is because it is conceivable that the injection period overlaps with the interference period, and the injection fuel from the injector 7 is adhered to the opened intake valve 13 with the results that the A/F value is varied to the lean side. In that case, the microcomputer 31 returns the injection ending timing to an earlier timing by a given value so that the subsequent injection period does not overlap with the interference period (S430). Then, the microcomputer 31 sets a start-timing-detection completion flag (S440) to terminate the detection of the interference period start timing for the target cylinder.

Figure 7:
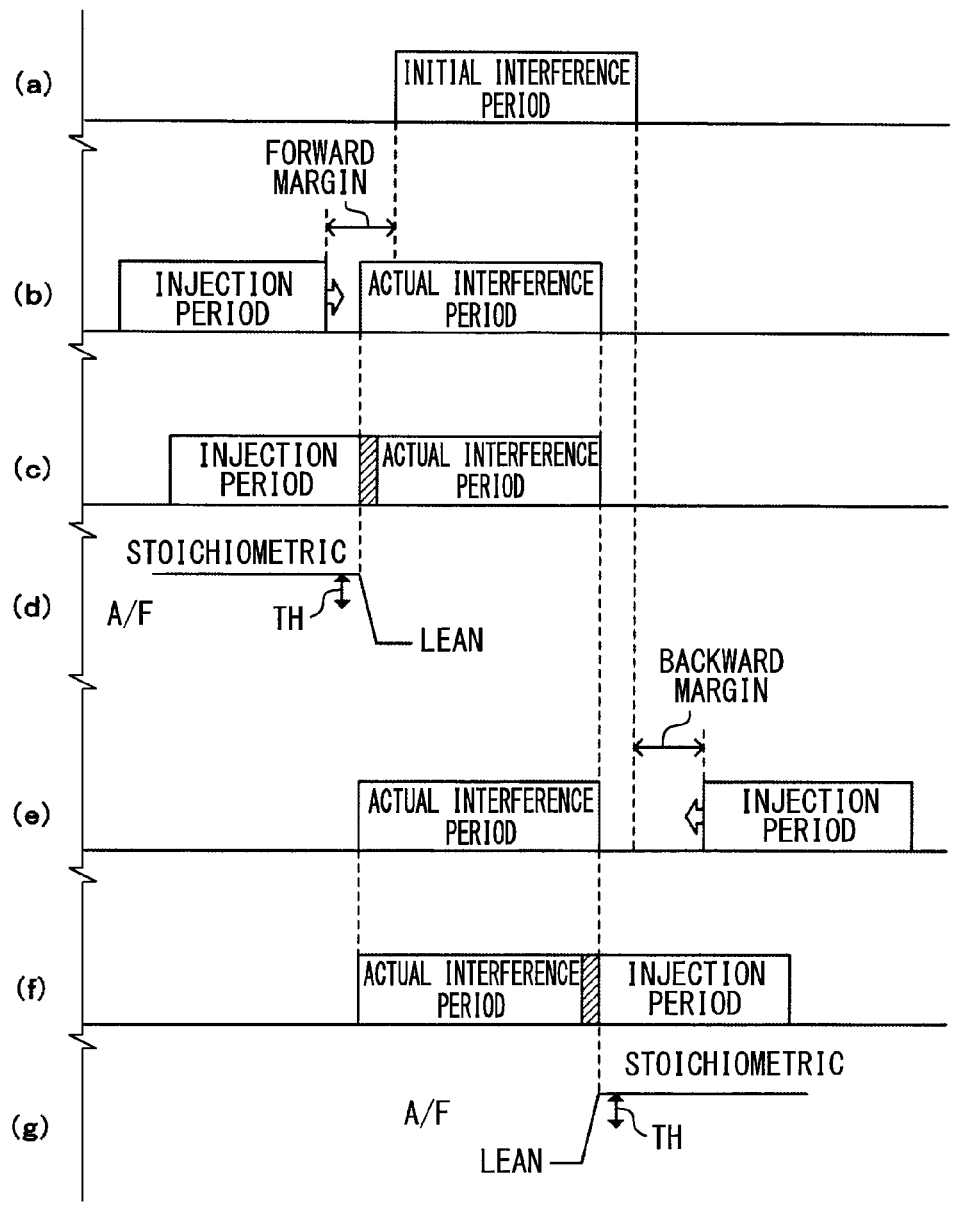
FIG. 7 is a chart for explaining an operation of the controller according to the first embodiment.

That is, in the start-timing-detection processing, as indicated in portions (a)-(d) of FIG. 7, the injection period is shifted backward by a given value from a period that does not overlap with the initial interference period (initial value) in which the ending timing of the injection period is earlier than the start timing of the initial interference period by a forward margin. Then, upon detecting that the variation of the A/F value caused by shifting the injection period becomes a threshold value or larger, the microcomputer 31 detects the ending timing of the injection period causing the variation of the A/F value which is larger than or equal to the threshold as the start timing of the actual interference period, and stores the detected start timing in the EEPROM 44.

(Ending-Timing-Detection Processing of Interference Period)

Figure 6:
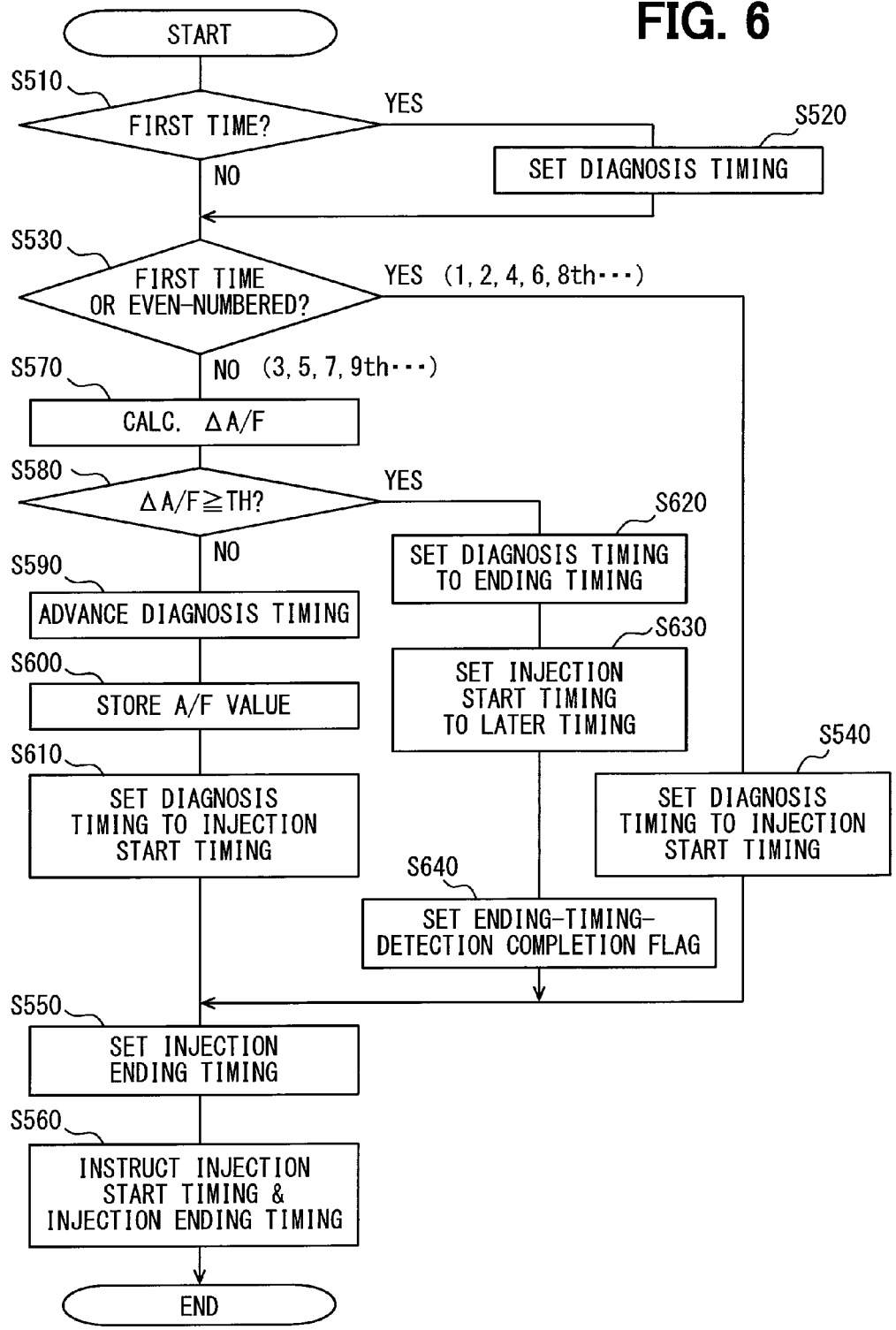
FIG. 6 is a flowchart illustrating an ending-timing-detection processing of the interference period.

The microcomputer 31 repetitively conducts the ending-timing-detection processing of FIG. 6 for each of the cylinders 5 until the interference-period-ending timing has been completely detected, in S150 of FIG. 4. As in the start-timing-detection processing, the ending-timing-detection processing is also executed at each timing (timings indicated by the down arrows in FIG. 2) immediately before the exhaust stroke of the target cylinder. Then, the injection quantity is calculated for the target cylinder through the above-mentioned injection-quantity-calculation processing before the ending-timing-detection processing starts.

As illustrated in FIG. 6, when the microcomputer 31 starts the ending timing detection process, the microcomputer 31 first determines whether the present execution of the ending-timing-detection processing for the target cylinder is a first time execution in S510. When the present execution is the first time execution, the microcomputer 31 sets a timing after the ending timing of an initial interference period by a given backward margin as a diagnosis timing in S520. The backward margin represents a value (unit is a crank angle) larger than a calculated maximum shift amount by which the ending timing of the actual interference period is shifted backward from the ending timing of the initial interference period. Also, the diagnosis timing dealt with in the ending-timing-detection processing is auxiliary information for determining the injection start timing.

When the microcomputer 31 conducts the processing in S520, or determines that the present execution is not the first time execution in S510, the flow proceeds to S530. Then, the microcomputer 31 determines whether the present execution of the ending-timing-detection processing is the first time execution or an even-numbered execution, for the target cylinder.

Then, when the present execution is the first time execution or an even-numbered execution (YES in S530), the flow proceeds to S540, the microcomputer 31 sets the diagnosis timing at that time as the injection start timing, and the flow proceeds to S550.

The microcomputer 31 sets a timing after the injection ending timing set in the ending-timing-detection processing by an injection time corresponding to the injection quantity as the injection ending timing in S550. Then, the microcomputer 31 conducts processing for instructing the injector 7 on the injection start timing, and the injection ending timing set in the ending-timing-detection processing, in subsequent S560. The contents of that processing are identical with S360 in FIG. 5. Thereafter, the microcomputer 31 completes the ending-timing-detection processing. For that reason, the injector 7 of the target cylinder allows the valve to open by the aid of the drive circuit 35 during a period from the injection start timing to the injection ending timing set in the ending-timing-detection processing.

Also, when the microcomputer 31 determines that the present execution of the ending-timing-detection processing is neither the first time execution nor an even-numbered execution (that is, an odd-numbered execution other than the first time execution) in S530 (NO in S530), the flow proceeds to S570.

The microcomputer 31 calculates a difference $\Delta A/F$ (absolute value of the difference) between an acquired value of the A/F value and a stored value of the A/F value in S570. The acquired value of the A/F value represents an updated A/F value (reference A/F value) acquired from the A/F sensor 27 in the above-mentioned A/F-value-acquisition processing (FIG. 3) for the target cylinder. Also, the stored value of the A/F value represents an A/F value stored in the RAM 43 in S600 described later in the last but one ending-timing-detection processing. When the present execution of the ending-timing-detection processing is a third time execution, because the stored value of the A/F value is not yet present, the calculated difference is set as a fixed value smaller than a threshold value used for determination in subsequent S580, in S570.

Subsequently, the microcomputer 31 determines in S580 whether the difference $\Delta A/F$ calculated in S570 is larger than or equal to the threshold TH. When the difference is not larger than or equal to the threshold, the flow proceeds to S590.

The microcomputer 31 changes the diagnosis timing to a value advanced (earlier) by a given value smaller than the above-mentioned backward margin (unit is a crank angle) in S590. The microcomputer 31 stores the acquired value of the A/F value read in the present S570 as the stored value of the A/F value in the RAM 43 in subsequent S600. Then, as in Step 540, the microcomputer 31 sets the diagnosis timing at that time as the injection start timing in subsequent S610. Thereafter, the microcomputer 31 conducts the processing in S550 and S560, and completes the ending-timing-detection processing.

When the microcomputer 31 determines that the difference calculated in S570 is larger than or equal to the threshold in S580, the flow proceeds to S620. The microcomputer 31 stores the diagnosis timing at that time as the detection result of the ending timing of the interference period, for example, in the EEPROM 44.

Subsequently, the microcomputer 31 sets a timing after the diagnosis timing by a given value as the injection start timing in S630. This is for the injection period of the fuel injection implemented from now to be prevented from overlapping with the actual interference period. The given value used in S630 is identical with, for example, the given value by which the diagnosis timing is advanced in S590, but may be larger than that value.

The microcomputer 31 sets an ending-timing-detection completion flag for the target cylinder in subsequent S640. Thereafter, the microcomputer 31 conducts the processing of S550 and S560, and completes the ending-timing-detection processing.

When the ending-timing-detection completion flag for the target cylinder is set in S640, it is determined that the interference-period-ending timing has been completely detected for the target cylinder, in S140 of the overall processing of FIG. 4. Then, in S150 of FIG. 4, the ending-timing-detection processing is conducted on another cylinder 5 of which interference-period-ending timing has not yet been detected as a target cylinder. Also, the ending-timing-detection completion is stored in the EEPROM 44.

On the other hand, the cylinders 5 not subjected to the processing (detection processing) of FIGS. 5 and 6 is subjected to the normal injection control processing.

(Ending-Timing-Detection Processing)

At the time of the first time execution of the ending-timing-detection processing, the microcomputer 31 sets a timing after the ending timing of the initial interference period by a backward margin as an injection start timing (S520, S540). Then, even when how many times the ending-timing-detection processing is executed, the microcomputer 31 sets the timing after the set injection start timing by the injection time as the injection ending timing. Also, the microcomputer 31 allows the injector 7 to inject fuel during a period from the set injection start timing to the injection ending timing (S550, S560). The injection quantity is fixed when the ending-timing-detection processing is implemented.

Also, the microcomputer 31 sets the injection starting timing to the same value as the previously set value at an even-numbered execution time of the ending-timing-detection processing (540). Further, the microcomputer 31 acquires the A/F value from the NF sensor 27 at each timing immediately after the exhaust stroke after the even-numbered ending-timing-detection processing has been executed. In the above-mentioned FIG. 2, the timings indicated by the unhatched down arrows represent even-numbered execution timings of the ending-timing-detection processing. The timings indicated by the hatched down arrows represent odd-numbered execution timings of the ending-timing-detection processing.

Then, the microcomputer 31 calculates a difference (that is, variation of the NF value) between an updated acquired value of the A/F value, and the stored value which is a previous acquired value of the A/F value at the time of an odd-numbered execution of the ending-timing-detection processing other than the first time execution (S570). Further, the microcomputer 31 determines whether the calculated difference is a threshold value or larger (S580). When the difference is not larger than or equal to the threshold (NO in S580), the microcomputer 31 determines that the injection period adjusted in the ending-timing-detection processing has not yet overlapped with the interference period, and changes the injection start timing to a value advanced from the previous set value by a given value (S590, S610). In this case, the injection period is advanced toward the interference period by the given value. On the other hand, when the calculated difference is larger than or equal to the threshold (YES in S580), the microcomputer 31 determines that the set value (diagnosis timing) of the present injection start timing is the ending timing of the actual interference period, and stores the set value of the injection start timing in the EEPROM 44 as the ending timing of the interference period (S620). This is because it is conceivable that the injection period overlaps with the interference period, and the injection fuel from the injector 7 is adhered to the opened intake valve 13 with the results that the A/F value is varied to the lean side. In that case, the microcomputer 31 returns the injection start timing to a later timing by a given value so that the subsequent injection period does not overlap with the interference period (S630). Then, the microcomputer 31 sets an ending-timing-detection completion flag (S640) to terminate the detection of the interference-period-ending timing for the target cylinder.

That is, in the ending-timing-detection processing, as indicated in portions (a), (e)-(g) of FIG. 7, the injection period is shifted forward by a given value from a period that does not overlap with the initial interference period (initial value of interference period), in which the start timing of the injection period is later than the ending timing of the initial interference period by a backward margin. Then, upon detecting that the variation of the A/F value caused by shifting the injection period becomes a threshold value or larger, the microcomputer 31 detects the start timing of the injection period causing the variation of the A/F value which is larger than or equal to the threshold as the ending timing of the actual interference period, and stores the detected ending timing in the EEPROM 44.

According to the ECU 1 described above, because the microcomputer 31 conducts the detection processing (start-timing-detection processing and ending-timing-detection processing) for detecting the interference period for each of the cylinders 5, the actual interference period can be detected even when the interference period is changed with time. In the normal injection control processing, the microcomputer 31 sets the injection period so that the injection period does not overlap with the interference period, on the basis of the detected implemented interference period. As a result, even when the interference period is steadily shifted with time, the required amount of fuel can be supplied into the cylinders 5. Hence, the output reduction of the engine 3 and the deterioration of the emission can be prevented.

Also, in the detection processing, the microcomputer 31 gradually shifts the injection period from the initial first period during which the injection period does not overlap with the initial interference period stored in the ROM 42 toward the second period during which the injection period overlaps with the initial interference period. Then, the microcomputer 31 detects the actual interference period when the variation of the A/F value is greater than or equal to the threshold value. For that reason, the actual interference period can be detected with high precision. Moreover, because the microcomputer 31 conducts the start-timing-detection processing and the ending-timing-detection timing as the detection processing, separately, the microcomputer 31 can detect the start timing and the ending timing of the interference period with high precision, separately.

Also, the microcomputer 31 sequentially implements the detection processing for detecting the interference period for each of the plural cylinders 5, whereby the interference period for each of the cylinders 5 is sequentially detected. Specifically, the microcomputer 31 repeats a procedure of conducting the start-timing-detection processing for one cylinder 5, and then conducting the start-timing-detection processing for a subsequent cylinder 5 upon detection of the start timing of the interference period, whereby the start timing of the interference period for all of the cylinders 5 is detected. Likewise, the microcomputer 31 repeats a procedure of conducting the ending-timing-detection processing for one cylinder 5, and then conducting the ending-timing-detection processing for a subsequent cylinder 5 upon detection of the ending timing of the interference period, whereby the ending timing of the interference period for all of the cylinders 5 is detected. For that reason, the variation of the A/F value caused by allowing the injection period to overlap with the interference period is easily confirmed for the respective cylinders 5. Hence, the interference period for each cylinder 5 can be detected with high precision with the avoidance of an influence of the emission from the other cylinders 5.

In the above example, the microcomputer 31 detects the start timing of the interference period for each of the cylinders 5, and thereafter detects the ending timing of the interference period for each of the cylinder 5. Alternatively, as a modification, the microcomputer 31 may first detect the ending timing of the interference period. That is, in the overall processing of FIG. 4, the order of S120 and S130, and S140 and S150 may be reversed. Also, as another modification, for example, the microcomputer 31 conducts the start-timing-detection processing for one cylinder 5. After detecting the start timing of the interference period, the microcomputer 31 conducts the ending-timing-detection processing for the same cylinder 5. After detecting the ending timing of the interference period, the microcomputer 31 detects the start timing and the ending timing of the interference period for a subsequent cylinder 5 in the same manner. This procedure may be repeated.

Also, in the above embodiment, the microcomputer 31 stores the detection results of the interference period for each of the cylinders 5 in the EEPROM 44 as a nonvolatile storage unit (S420, S620).

For that reason, even though, for example, a power supply to the CPU 1 is cut off during the implementation of the interference period detection, and the interference period detection is interrupted, when the detection implementation condition is thereafter met during the operation of the ECU 1, the microcomputer 31 has only to conduct the detection processing on only the undetected contents in the start timing and the ending timing of the interference period for each of the cylinders 5. For example, the detection processing may be conducted on only the cylinders 5 having the interference period undetected among all of the cylinders 5. In that case, when one of the start timing and the ending timing of the interference period has been detected for a certain cylinder 5, the detection processing may be conducted on only the undetected one. The same is applied to a case in which the detection implementation condition is not met during implementation of the interference period detection, and thereafter the detection implementation condition is again met.

Also, the microcomputer 31 implements the interference period detection when the detection implementation condition (corresponding to a predetermined given condition) is met (YES in S110) in the normal operation of the engine 3. For that reason, even when a user of the vehicle does nothing, the updated interference period is detected by the ECU 1, and reflected on the injection control processing, as a result of which the convenience is excellent. For example, when a condition in which a given time elapses from the implementation time of the previous interference timing detection, or a condition in which the vehicle travels a given distance is set as the detection implementation condition, the interference period detection is automatically and periodically implemented, which is preferable.

Also, in this embodiment, the injection period is shifted to the initial interference period at a rate of once per two cycles of the stroke of the cylinders 5. As a result, the variation of the A/F value caused by allowing the shifted injection period to overlap with the interference period can be detected with precision.

The detection precision of the interference period is also more improved as a sensor with higher precision is used as the A/F sensor 27.

Second Embodiment

Subsequently, an ECU according to a second embodiment will be described. The ECU is denoted by the same reference numeral 1 as that in the first embodiment. Also, components and processing identical with those in the first embodiment are also denoted by the same reference numerals as those in the first embodiment. The same is applied to other embodiments which will be described later.

Differences from the first embodiment will be described. In an ECU 1 of the second embodiment, even when the microcomputer 31 detects that a given detection instruction is given (transmitted) to the ECU 1 from a failure diagnosis tool 37 as an external device, the microcomputer 31 determines that the detection implementation condition is met in S110 of FIG. 4. For that reason, even when the microcomputer 31 receives the detection instruction from the failure diagnosis tool 37, the microcomputer 31 implements the above-mentioned interference period detection. In more detail, the microcomputer 31 conducts processing of S120 to S210 in FIG. 4.

In that case, for example, an operating state of the engine 3 is fixed to a state in which the detection implementation condition of the first embodiment is met. Also, when the detection instruction is transmitted from the failure diagnosis tool 37 to the ECU 1, the operating state of the engine 3 is fixed so that the detection implementation condition in the first embodiment is met. As a result, the detection implementation condition is met, and the microcomputer 31 may implement the interference period detection.

According to the ECU 1 of the second embodiment, the detection of the interference period can be implemented at an arbitrary timing such as a vehicle inspection timing in a car dealer. Hence, it is advantageous in that the detection of the interference period can be intentionally and periodically implemented. Also, because some time is given at the vehicle inspection time, the detection of the interference period for all of the cylinders 5 is surely easily completed.

The microcomputer 31 may implement the interference period detection only when receiving the detection instruction from the failure diagnosis tool 37.

Third Embodiment

Figure 8:
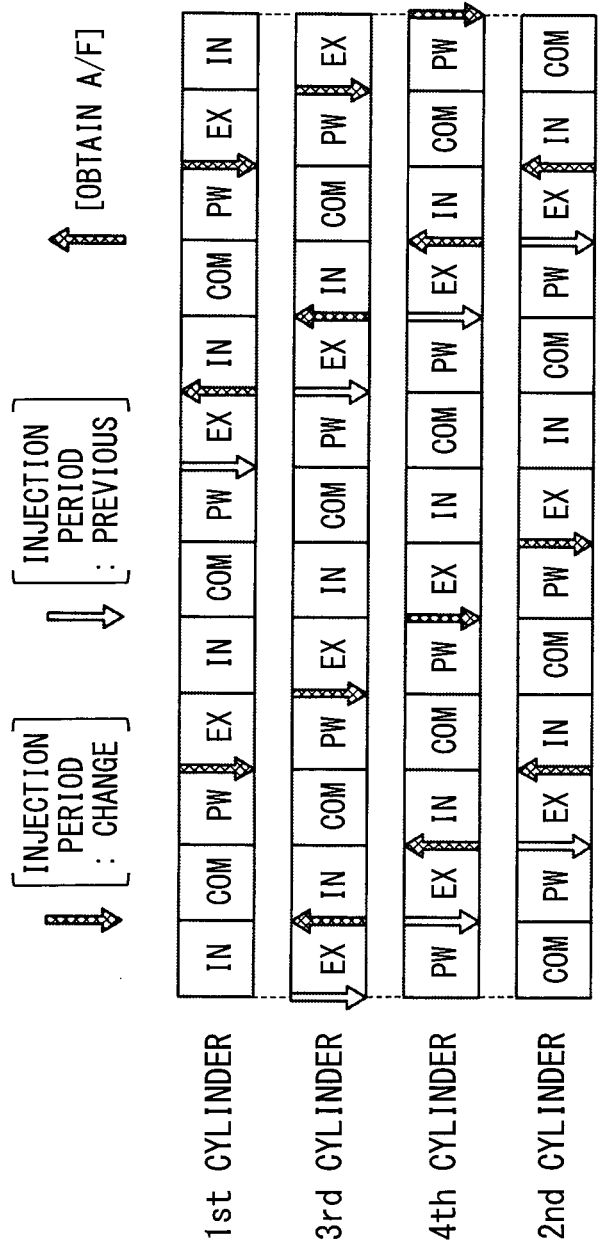
FIG. 8 is a chart for explaining a third embodiment.

Differences from the first and second embodiments will be described. In an ECU 1 of a third embodiment, the microcomputer 31 implements detection processing for the respective cylinders 5 not in order cylinder by cylinder, but in parallel as illustrated in FIG. 8.

With the above configuration, a time until the interference periods for all of the cylinders 5 can be detected can be reduced. For that reason, this configuration is advantageous when the microcomputer 31 implements the interference period detection in a normal operation of the engine 3.

A timing at which an A/F value is acquired from an A/F sensor 27 may be determined according to an attachment position of the A/F sensor 27 so that the A/F values caused by emission of the respective cylinders 5 can be distinguished.

The embodiments of the present disclosure have been described above. However, the present disclosure is not limited to the above embodiments, but can be variously embodied. For example, a function provided in one component in the above embodiments may be diverged on a plurality of components, or functions provided in a plurality of components may be integrated into one component. Also, at least a part of the configuration in the above embodiments may be replaced with a known configuration having the same function. Also, a part of the configuration in the above embodiments may be omitted so far as the problem can be solved. Also, at least a part of the configuration in the above embodiments may be added to or replaced with another configuration in the above embodiments. Also, the above-mentioned numerical values are exemplary.

Also, for example, in the first embodiment, the injection quantity which is a source of an injection time used in S350 and S550 of the detection processing represents the injection quantity calculated in the injection-quantity-calculation processing according to the condition of (1). However, the injection quantity (that is, injection quantity when detecting the interference period) which is a source of the injection time may be a predetermined fixed value. Likewise, this modification can be applied to the other embodiments.

Also, for example, in the first embodiment, the microcomputer 31 may implement the interference period detection for each of plural values of the ND-angle variable by the variable valve mechanism 20. In that case, the actual interference period is detected for each of the plural values of the ND-angle variable, and stored in the EEPROM 44. For that reason, in the injection-period-correction processing of the normal fuel injection control processing, a detected value of the interference period corresponding to the advance/retard controlled variable is selected from the EEPROM 44, and the injection period can be set to avoid the selected interference period. Likewise, this modification can be applied to the other embodiments.

What is claimed is:

1. A fuel injection controller that controls a fuel injector which injects a fuel directly into a cylinder of an engine during an injection period, comprising:
an air-fuel ratio sensor disposed in an exhaust passage of the engine, and
an interference period detection unit detecting an interference period of an crank angle range in which the fuel injected from the fuel injector is adhered to an opened intake valve, wherein
the interference period detection unit shifts an injection period from a first period during which the injection period does not overlap with the interference period toward a second period during which the injection period overlaps with the interference period, and then the interference period detection unit detects the interference period according to a variation of an air-fuel ratio detected by an air-fuel ratio sensor.

2. The fuel injection controller according to claim 1, further comprising:
an initial value storage unit storing an initial value of the interference period therein,
wherein the interference period detection unit gradually shifts the injection period from a period that does not overlap with the initial value, and is distant from the initial value by a given value or larger toward another period that overlaps with the initial value, and detects an actual interference period according to a variation of the air-fuel ratio.

3. The fuel injection controller according to claim 2, wherein
the interference period detection unit includes:
a start timing detection unit that shifts the injection period backward by a given value from a period that does not overlap with the initial value, in which the ending timing of the injection period is earlier from the start timing of the initial value by a given forward margin, and
an ending timing detection unit that shifts the injection period forward by a given value from a period that does not overlap with the initial value, in which the start timing of the injection period is later from the ending timing of the initial value by a given backward margin,
the start timing detection unit detects an ending timing of the injection period causing the variation of the air-fuel ratio which is larger than or equal to the threshold as the start timing of the interference period, when the start timing detection unit detects that a variation of the air-fuel ratio caused by shifting the injection period becomes a given threshold value or larger, and
the ending timing detection unit detects a start timing of the injection period causing the variation of the air-fuel ratio which is larger than or equal to the threshold as the ending timing of the interference period, when the ending timing detection unit detects that a variation of the air-fuel ratio caused by shifting the injection period becomes another given threshold value or larger.

4. The fuel injection controller according to claim 1, wherein
the engine includes a plurality of the cylinders, and
the interference period detection unit sequentially implements an operation for detecting the interference period for each of the cylinders.

5. The fuel injection controller according to claim 4, wherein
the interference period detection unit stores a detection result of the interference period for each of the cylinders in a nonvolatile storage unit.

6. The fuel injection controller according to claim 1, wherein
the interference period detection unit operates when a predetermined condition is met in a normal operation of the engine.

7. The fuel injection controller according to claim 1, wherein
the interference period detection unit operates when a given detection instruction is supplied to the fuel injection controller from an external device.

* * * * *